(12) United States Patent
Satcher, Jr. et al.

(10) Patent No.: US 7,087,544 B2
(45) Date of Patent: *Aug. 8, 2006

(54) NANO-CERAMICS AND METHOD THEREOF

(75) Inventors: Joe H. Satcher, Jr., Patterson, CA (US); Alex Gash, Livermore, CA (US); Randall Simpson, Livermore, CA (US); Richard Landingham, Livermore, CA (US); Robert A. Reibold, Salida, CA (US)

(73) Assignee: The Regents of the University of California, Oakland, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/447,119

(22) Filed: May 28, 2003

(65) Prior Publication Data

US 2003/0224924 A1    Dec. 4, 2003

Related U.S. Application Data (60) Provisional application No. 60/384,365, filed on May 29, 2002.

(51) Int. Cl.
   *C04B 35/56*  (2006.01)
   *C04B 35/624* (2006.01)
   *C09K 3/14*   (2006.01)
   *B01J 13/00*  (2006.01)

(52) U.S. Cl. .......................... 501/87; 501/12; 501/127; 501/153; 502/177; 516/98; 427/215

(58) Field of Classification Search .................. 516/98; 501/87, 127, 153, 12; 264/621, 624; 502/177; 427/215

See application file for complete search history.

(56) References Cited

U.S. PATENT DOCUMENTS

| | | | | |
|---|---|---|---|---|
| 1,930,716 A | * | 10/1933 | Jaeger ........................ 549/248 |
| 1,951,718 A | * | 3/1934 | Kaspar et al. ................. 516/78 |
| 3,425,666 A | | 2/1969 | Lindquist et al. |
| 3,458,306 A | | 7/1969 | Lindquist et al. |
| 3,922,331 A | * | 11/1975 | MacDonald et al. ......... 423/263 |
| 3,981,979 A | | 9/1976 | Braithwait et al. |
| 4,571,315 A | * | 2/1986 | Gerontopoulos et al. ..... 501/87 |
| 4,574,003 A | | 3/1986 | Gerk |
| 5,039,559 A | * | 8/1991 | Sang et al. ................... 516/98 |
| 5,378,665 A | | 1/1995 | Chen et al. |
| 6,245,849 B1 | | 6/2001 | Morales et al. |
| 2003/0202933 A1 | * | 10/2003 | Gash et al. ................. 423/607 |

FOREIGN PATENT DOCUMENTS

| | | | |
|---|---|---|---|
| DE | 19945335 | * | 4/2001 |
| EP | 0088848 A2 | | 12/1982 |
| EP | 0603715 | | 12/1993 |
| WO | WO 99/50203 | | 10/1999 |

* cited by examiner

*Primary Examiner*—Daniel S. Metzmaier
(74) *Attorney, Agent, or Firm*—John P. Wooldridge; Alan H. Thompson; Ann M. Lee (57) ABSTRACT

Disclosed herein is a method to produce ceramic materials utilizing the sol-gel process. The methods enable the preparation of intimate homogeneous dispersions of materials while offering the ability to control the size of one component within another. The method also enables the preparation of materials that will densify at reduced temperature.

4 Claims, 12 Drawing Sheets

Figure 1

TABLE 2

| SAMPLE/ PELLET | CONDITIONS | Dimensions After Pressing | | | | | Dimensions After Sintering at 1550 °C | | | | |
|---|---|---|---|---|---|---|---|---|---|---|---|
| | | DIAMETER (INCHES) | LENGTH (INCHES) | WEIGHT (gm) | DENSITY gm/cc | DENSITY (% theor.) | DIAMETER (INCHES) | LENGTH (INCHES) | WEIGHT (gm) | DENSITY gm/cc | DENSITY (% theor.) |
| Sample A Pellet A-1 | CP 10 ksi | 1.375 | 0.125 | 3.28 | 1.078 | 27.2 | n/a | n/a | 2.42 | n/a | n/a |
| Sample A Pellet A-2 | Calcined 800 °C | 0.75 | 0.1222 | 0.879 | 0.994 | 25.1 | 0.615 | 0.1082 | 0.8026 | 1.524 | 38.4 |
| Sample B Pellet B-1 | Oven dried 80 °C, CP 20 ksi | 1 | 0.2 | 4.09 | 1.59 | 40 | 0.788 | 0.196 | 2.8 | 1.79 | 45.1 |
| Sample C Pellet C-1* | Oven dried 80 °C Pressed 12.5 ksi | 1 | 0.2 | 4.37 | 1.7 | 42.8 | 0.662 | 0.182 | 3.306 | 3.22 | 81.2 |
| Sample C Pellet C-2* | Oven dried 80 °C HT 800 °C - 1 hr CP 22.5 ksi HT 1550 °C - 1 hr air | 0.75 | 0.294 | 2.728 | 1.28 | 32.3 | 0.527 | 0.2111 | 2.528 | 3.35 | 84.5 |
| Sample D Pellet DF-1 | Oven dried 80 °C Pressed 22.5 ksi | 1 | 0.25 | 4.92 | 1.523 | 43.3 | n/a | n/a | n/a | n/a | n/a |
| Sample C Pellet C-4 (preparation not described) | HT 1100 °C - 1 hr CP 20 ksi HT 1650 °C - 1 hr air | n/a | 0.205 | 2.405 | 1.62 | 40.9 | 0.573 | 0.1582 | 2.3517 | 3.518 | 88.7 |
| Sample C Pellet C-5 (preparation not described) | HT 800 °C - 1 hr CP 20 ksi HT 1550 °C - 1 hr air | 0.375 | 0.318 | 0.77 | 1.338 | 33.7 | 0.696 | 0.2255 | 0.696 | 3.467 | 87.4 |
| Sample C Pellet D-1 | PHT 1100 °C - 2 hr CP 20 ksi | 0.75 | 0.276 | 2.95 | 1.476 | 37.2 | 0.608 | 0.2225 | 2.8613 | 2.703 | 68.2 |
| Sample E Pellet E-1 | PHT 1100 °C - 2hr air CP 25 ksi | 0.75 | 0.166 | 2.48 | 2.06 | 52 | n/a | n/a | n/a | n/a | n/a |
| Sample G Pellet G-1 | PHT 800 °C Acetone wash CP 20 ksi HT 1650 °C - 1 hr air | 0.375 | 0.3777 | 1.02 | 1.492 | 37.6 | 0.316 | 0.311 | 0.9526 | 2.383 | 60.1 |
| Sample G Pellet G-2 | PHT 1100 °C CP 20 ksi HT 1650 °C - 1 hr air | 0.375 | 0.198 | 0.649 | 1.786 | 45 | 0.316 | 0.1726 | 0.6424 | 2.896 | 73 |
| Sample H Pellet H-1 | PHT 1100 °C - 2 hr Lg granules were sieved to -80 mesh CP 25 ksi | 0.75 | 0.3691 | 3.85 | 1.44 | 36.3 | n/a | n/a | n/a | n/a | n/a |
| Sample I Pellet I-1 | PHT 1100 °C - 2 hr Sm granules were sieved to -80 mesh CP 25 ksi | 0.075 | 0.2762 | 2.59 | 1.3 | 32.7 | n/a | n/a | n/a | n/a | n/a |

Legend:  CP = cold pressed; HT = heat treated; PHT = pre-heat treated; ksi = 1,000 pounds per square inch; *powders were ball milled to -80 mesh.

NANO-CERAMICS AND METHOD THEREOF

The present invention relates to and claims priority under 35 USC 120 to Provisional Application No. 60/384,365 filed May 29, 2002, entitled "Preparation of Nano-ceramics Using Sol-Gel Methods"

The United States Government has rights in this invention pursuant to Contract No. W-7405-ENG-48 between the United States Department of Energy and the University of California for the operation of Lawrence Livermore National Laboratory.

BACKGROUND OF THE INVENTION

The oxides and hydroxides of inorganic oxides materials, most notably aluminum, are among the most industrially useful chemicals. Their uses include precursors for the preparation of structural ceramics, electronic components, catalysts and their supports, adsorbents, and reinforcing agents. Traditional ceramic processing typically involves powder processing, shape-forming, and densification.

SUMMARY OF THE INVENTION

An object of the invention includes a method comprising: dissolving two or more metal salts in a solvent or solvent matrix to form a metal salt solution; adding a proton scavenger to the metal salt solution to form a gel; and drying the gel to form a composite material.

Another object of the invention includes a method comprising: dissolving one or more metal salts in a solvent or solvent matrix to form a metal salt solution; adding a one or more uniformly dispersed powdered materials to the metal salt solution to form a composite dispersion; adding a proton scavenger to the composite dispersion to form a gel; and drying the gel to form a composite material.

BRIEF DESCRIPTION OF THE DRAWINGS

FIG. 1 (Table 2) lists the dimensions before and after sintering of pellets from Samples A–I.

DETAILED DESCRIPTION

Uniform blends of one powder into another powder of different particle sizes and densities are difficult to achieve by current commercial methods. Such uniform blends are needed before powders can be consolidated into components having uniform microstructures that achieve higher strengths and more uniform properties. Microstructure refers to the structure as seen under a microscope. Disclosed herein is a method for the preparation of materials having ultrafine cell/pore sizes, continuous porosity, high surface area, and a microstructure composed of interconnected colloidal-like particles or polymeric chains with characteristic diameters in the 100 Å range. It is this microstructure that dictates the materials' optical, acoustical, thermal and mechanical properties.

The sol-gel process disclosed herein produces materials (1) having intimate homogeneous dispersions of materials offering the ability to control the size of one component within the other and (2) affording a material that will densify (sinter) at reduced temperatures. The dispersions can be prepared by either mechanical distribution of particles in relation to each other or by chemical dispersion.

Blends of powders were prepared in order to uniformly disperse commercial powders, e.g., carbides, nitrides, borides, and metals, into a very fine powder matrix, e.g., $Al_2O_3$. The blends were then cold pressed to consolidate the powders into disks and the dispersion of the disks was evaluated. Two methods to fabricate composite materials wherein the individual component materials have particle sizes different from each other are disclosed herein.

The first method of fabricating composite materials with individual component materials having different particle sizes comprises:
(1) dissolving a metal salt in a solvent matrix to form a metal salt solution,
(2) adding a proton scavenger to the metal salt solution to form a gel,
(3) optional adding of a base to the gel,
(4) washing the gel with a predetermined solvent, and
(5) drying the gel to form a composite material.

The gel can comprise any metal oxide. $Al_2O_3$, MgO, CaO, $ZrO_2$, and $Y_2O_3$ are effective. The solvent matrix can comprise any solvent or combination of solvents that the metal salt is soluble in. A proton scavenger is any molecule that is capable of binding to a hydrogen ion ($H^+$). Ammonia ($NH_3$) and epoxides, e.g., propylene oxide, are effective proton scavengers. The gel is washed with a solvent. In some cases, the gel is washed to remove salts produced by the proton scavenger addition and in other cases, the gel is washed to complete the gel-forming reaction. A composite material can be formed from the gel by air-drying, freeze-drying, vacuum drying, or drying under an inert atmosphere, e.g., argon or nitrogen flow. A slow uniform pH rise leads to small uniform particle sizes. Small particle sizes decrease the chance for crack propagation in the gel. Once formed, the density of the composite material can be increased by sintering.

The second method of fabricating composite materials with individual component materials having different particle sizes comprises:
(1) dissolving a metal salt in a solvent matrix to form a metal salt solution,
(2) adding a uniformly dispersed powdered materials to said metal salt solution to form a composite dispersion,
(3) adding a proton scavenger to the composite dispersion to form a gel,
(4) adding a base to the gel, optional washing the gel with a predetermined solvent, and
(5) drying the gel to form a composite material.

The gel can comprise any metal oxide. $Al_2O_3$, MgO, CaO, $ZrO_2$, and $Y_2O_3$ are effective. The solvent matrix can comprise any solvent or combination of solvents that the metal salt is soluble in. The powdered material serves as a grain-size growth inhibitor and can either be commercial or custom synthesized. Effective grain-size growth inhibitors include TiC and $B_4C$. A proton scavenger is any molecule that is capable of binding to a hydrogen ion ($H^+$). Ammonia ($NH_3$) and epoxides, e.g., propylene oxide, are effective proton scavengers. The gel is washed with a solvent. In some cases, the gel is washed to remove salts produced by the proton scavenger addition and in other cases, the gel is washed to complete the gel-forming reaction. A composite material can be formed from the gel by air-drying, vacuum drying, or drying under an inert atmosphere, e.g., argon or nitrogen flow. Once formed, the density of the composite material can be increased by sintering.

EXAMPLES

The following example is a sol-gel synthesis that results in the formation of a composite material. Seventy grams of $AlCl_3.6H_2O$ (metal salt) was dissolved in a solution of 28 grams water and 280 grams ethanol (solvent matrix) in a 1 liter round bottom flask equipped with stirring. When dissolved, 70 grams of propylene oxide (proton scavenger) was added while stirring vigorously to form a gel. Vigorous stirring prevents the resulting gel from forming a monolith. Thirty-six grams (1 equivalent) of 28–30% $NH_4OH$ (base) in 50 ml of EtOH was then added. Rotary evaporation with 3×500 ml aliquots of EtOH (washing) was used to remove volatile reactants. The resulting gel was taken to near dryness on the rotary evaporator and then vacuum dried at 100° C. overnight to yield 34.5 grams of product. The resultant gel has average particle dimensions ranging form 5–15 nm.

The preparation of 11 gels (Samples A through K) are described below and summarized in Table 1.

TABLE 1

| SAMPLE | COMPOSITION | PREPARATION |
|---|---|---|
| Sample A | $Al_2O_3$ | crystalline aerogel made from Aluminum sec-butoxide by acetic acid method |
| Sample B | $Al_2O_3$ | Xerogel |
| Sample C | $Al_2O_3$ | air dried powder |
| Sample D | $Al_2O_3/B_4C$ | air dried powder |
| Sample E | $Al_2O_3$ | $NH_4OH$ washed powder |
| Sample F | $Al_2O_3/B_4C$ | $NH_4OH$ washed powder |
| Sample G | $Al_2O_3$ | Acetone washed powder |
| Sample H | $Al_2O_3$ | Acetone washed powder |
| Sample I | $Al_2O_3$ | Acetone washed powder |
| Sample J | $Al_2O_3$ | $NH_4OH$ washed and acetone washed powder |
| Sample K | $Al_2O_3/TiC$ | EtOH washed granular solid |

Sample A is a crystalline aerogel prepared from Aluminum sec-butoxide by the acetic acid method. See "Synthesis of High Porosity, Monolithic Alumina Aerogels" J. F. Poco, J. H. Satcher Jr., and L. W. Hrubesh; J. Non-Cryst Solids, 285 (1–3), 57–63 (2001).

Sample B was prepared as follows: 10 g of $AlCl_6.6H_2O$ was added to a 150 ml beaker equipped with a Teflon® stir bar and dissolved in 10 g EtOH and 1 g $H_2O$. While stirring 0.456 g (23% by volume $B_4C/[Al_2O_3+B_4C]$) of $B_4C$ powder (density 2.52 g/cc; particle size 0.1–2 μm diameter) was added, followed by the addition of 9.6 g of propylene oxide. The gel set up in about 10 minutes and was dried overnight. It was then washed with 1% $NH_4OH$ and air dried overnight to yield 3.9 69 g of $Al_2O_3/B_4C$ xerogel.

Sample C was prepared as follows: 100 g of $AlCl_6.6H_2O$ was added to a 1 L beaker equipped with a Teflon® sir bar and dissolved in 400 g of EtOH. While stirring, 100 g of propylene oxide was added. After about 5 minutes the stir bar was removed. The gel set about 10 minutes after the propylene oxide addition. The gel was broken up with a spatula and washed with $NH_4OH$ (pH about 9) with stirring overnight. It was then filtered, washed with the $NH_4OH$ solution and allowed to air dry overnight. A gelatinous mass was formed. The gelatinous mass was ground to a near dry powder and weighed 36.09 g.

Sample D was prepared as follows: 70 g of $AlCl_6.6H_2O$ was added to a 1 L beaker equipped with a Teflon® stir bar. 28 g of $H_2O$ was added followed by 280 g EtOH and the mixture was stirred. After the $AlCl_6.6H_2O$ was completely dissolved, 4.561 g (30% by volume $B_4C/[Al_2O_3+B_4C]$) of $B_4C$ (density 2.52 g/cc; particle size 0.1–2 μm diameter) was added. When the $B_4C$ was uniformly dispersed, 70 g of propylene oxide was added while stirring and the stirring was continued until the gel set. The gel was broken up, filtered and washed with a 50/50 solution of EtOH/0.3% $NH_4OH$ and air dried to yield an $Al/B_4C$ xerogel weighing 29.29 g.

Sample E was prepared as follows: 300 g of $AlCl_6.6H_2O$ was added to a large flask equipped with a Teflon® sir bar and dissolved in 1200 g of EtOH. While stirring, 300 g of propylene oxide was added and a gel formed. About ⅔ of the mother liquor was decanted and the gel was broken up with stirring overnight. The pieces of gel were filtered, washed with the 1% $NH_4OH$ (aq) solution and allowed to air dry overnight to form hard clumps. The hard clumps were ground by mixing with $H_2O$ in a blender. The blended mixture was poured into a tray and air dried over 7 days. The dry material was then filtered, washed 3 times with acetone, and allowed to air dry. The reaction yielded about 90 g of $Al_2O_3$ xerogel.

Sample F was prepared as follows: 300 g of $AlCl_6.6H_2O$ was added to a large flask equipped with a Teflon® stir bar. 120 g of $H_2O$ was added followed by 1200 g EtOH. After the $AlCl_6.6H_2O$ was completely dissolved, 19.547 g (30% by volume $B_4C/[Al_2O_3+B_4C]$) of $B_4C$ (density 2.52 g/cc; particle size 0.1–2 μm diameter) was added to the $AlCl_6.6H_2O$ solution. When the $B_4C$ was uniformly dispersed, 300 g propylene oxide was added while stirring and the stirring was continued until the gel set. The next day, ⅔ of the mother liquor was decanted and the gel was broken up with stirring overnight. Next the gel pieces were filtered, washed with a 1% solution of $NH_4OH$ (aq) and air dried for 3 days. The gel pieces were then blended in a blender with 1% $NH_4OH$ (aq), poured into a tray, air dried for 3 days, washed with acetone 3 times, air dried for 3 more days and rinsed with acetone again.

Sample G was prepared as follows: 80 g of $AlCl_6.6H_2O$ was added to a 1 L beaker equipped with a Teflon® sir bar and dissolved in 32 g of H2O and 192 g of EtOH. While stirring, 49.6 g of propylene oxide was added. After about 5 minutes the stir bar was removed. The gel set within about 10 minutes of the propylene oxide addition. The gel was broken up, put into a petri dish and washed with acetone.

Sample H was prepared as follows: 80 g of $AlCl_6.6H_2O$ was added to a 1 L beaker equipped with a Teflon® sir bar and dissolved in 32 H2O and 192 g of EtOH (about 1 hour to completely dissolve). While stirring, 49.6 g of propylene oxide was added. The gel set within about 15 minutes of the propylene oxide addition and after about 25 minutes the stir bar stopped. 500 ml of acetone was added to break up the gel with stirring overnight. The gel was then filtered, washed several times with acetone and allowed to air dry overnight.

Sample I was prepared as follows: 80 g of $AlCl_6.6H_2O$ was added to a 1 L beaker equipped with a Teflon® sir bar and dissolved in 32 H2O and 192 g of EtOH (about 1 hour to completely dissolve). While stirring, 77 g of propylene oxide was added. The gel set within about 15 minutes of the propylene oxide addition and after about 25 minutes the stir bar stopped. 500 ml of acetone was added to break up the gel with stirring overnight. The gel was then filtered, washed several times with acetone and allowed to air dry overnight. The reaction yielded 38.91 g of product.

Sample J was prepared as follows: 2400 g of $AlCl_6.6H_2O$ was added to a 5 gallon bucket equipped with a Teflon® sir bar and lid and dissolved in 960 g of $H_2O$ and 9600 g of EtOH. While stirring, 2310 g of propylene oxide was added and the temperature increased to about 35° C. The gel set within about 5 minutes of the propylene oxide addition. The solvent was drained from the gel and the gel was washed with $NH_4OH$ (pH about 9) several times until the pH was unchanged. The gel was soaked overnight in $NH_4OH$ (pH about 9). The ammonium hydroxide was drained and gel mixed with acetone and soaked in acetone overnight. The acetone was drained and the gel was poured into a flat tray and allowed to air dry.

Sample K was prepared as follows: 70 g $AlCl_6.6H_2O$ was added to a 1 L round bottom flask equipped with a Teflon® stir bar and dissolved in 28 g $H_2O$ and 250 g EtOH. When completely dissolved 10.25 g TiC powder (density −4.95 g/cc, particle size 0.25–10 μm diameter) was added (33 vol. % $TiC/Al_2O_3$. When thoroughly mixed, 70 g propylene oxide was added while stirring. Gel formed, but gel was kept broken-up to maximize the dissipation of TiC. After 2 hours, 36 g of $NH_4OH(aq)$ in 50 ml of EtOH was added. The mixture was stirred for about 2 hours and the solvent removed on a rotary evaporator at 80° C. 500 ml of EtOH was added and the mixture was stirred until the gel broke up. The mixture was then rotary evaporated to near dryness. Another 500 ml aliquot of EtOH was added and the mixture was stirred overnight. Rotary evaporation led to the recovery of a charcoal gray granular solid which was placed in a vacuum oven at 100° C. for several days to yield 44.75 g of $Al_2O_3/TiC$ (33% V/V) xerogel.

Results of Heat Treating and Sintering

Results of the pellets formed by pressing Samples A–K are listed in FIG. 1 and/or described below.

Sample A was first evaluated without pressing. Sample A lost 1.81% of its weight when oven dried at 80° C. overnight. It lost another 22.25% of its weight after sintering at 1000° C. for 1 hour in air. When sintered in air to 1550° C., it lost another 5.95% of its weight and decreased in size from approximately a 1 inch cube to less than a ¼ inch cube. It sintered to a density of 63.2% (theoretical density is 3.965 grams/cm$^3$). The sintered piece was hard but low strength. Higher sintering temperatures would be needed to achieve higher densities and/or greater strengths. Cold pressing and sintering of Sample A was also attempted to achieve higher densities.

Referring to FIG. 1, direct pressing of the aerogel in a steel die at 10,000 psi resulted in a pellet (pellet A-1) that delaminated during sintering. This delaminating was caused by the large amount of gases released from the pellet during sintering. Pellet A-2 was first heat treated to 800° C. for one hour in air and then cold pressed into a pellet. While the pre-heat treatment helped maintain the shape of the pellet during the sintering process (1550° C. for one hour in air), it had a very low density (38.4% of theoretical density) and strength. Higher pre-heat treating temperatures will be needed to reduce the weight loss (8.69%) of Sample A if higher densities are desired.

Figure 2A:
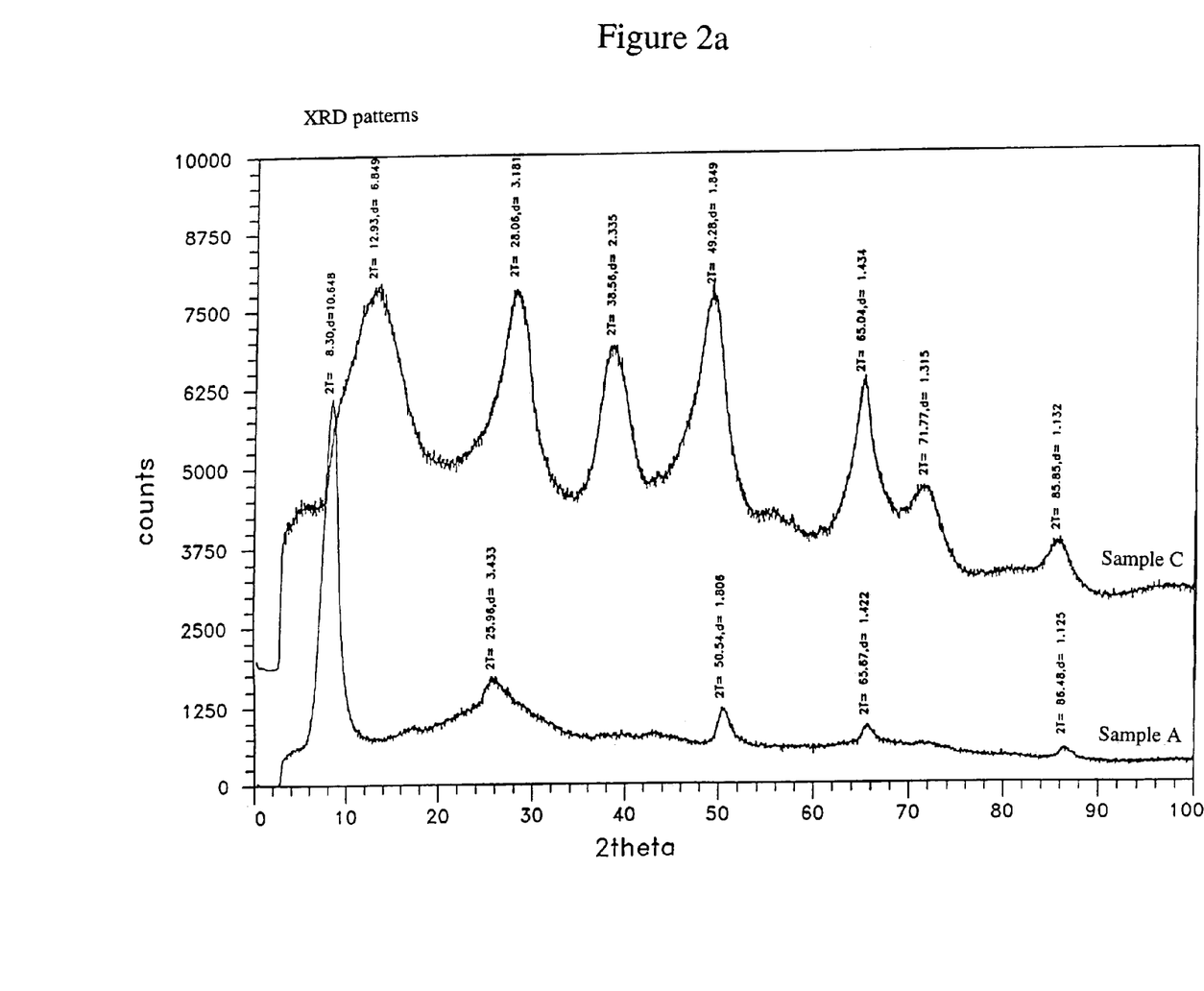
FIGS. 2a–2d show X-ray diffraction patterns of pellets produced from Sample A and Sample C.
Figure 2B:
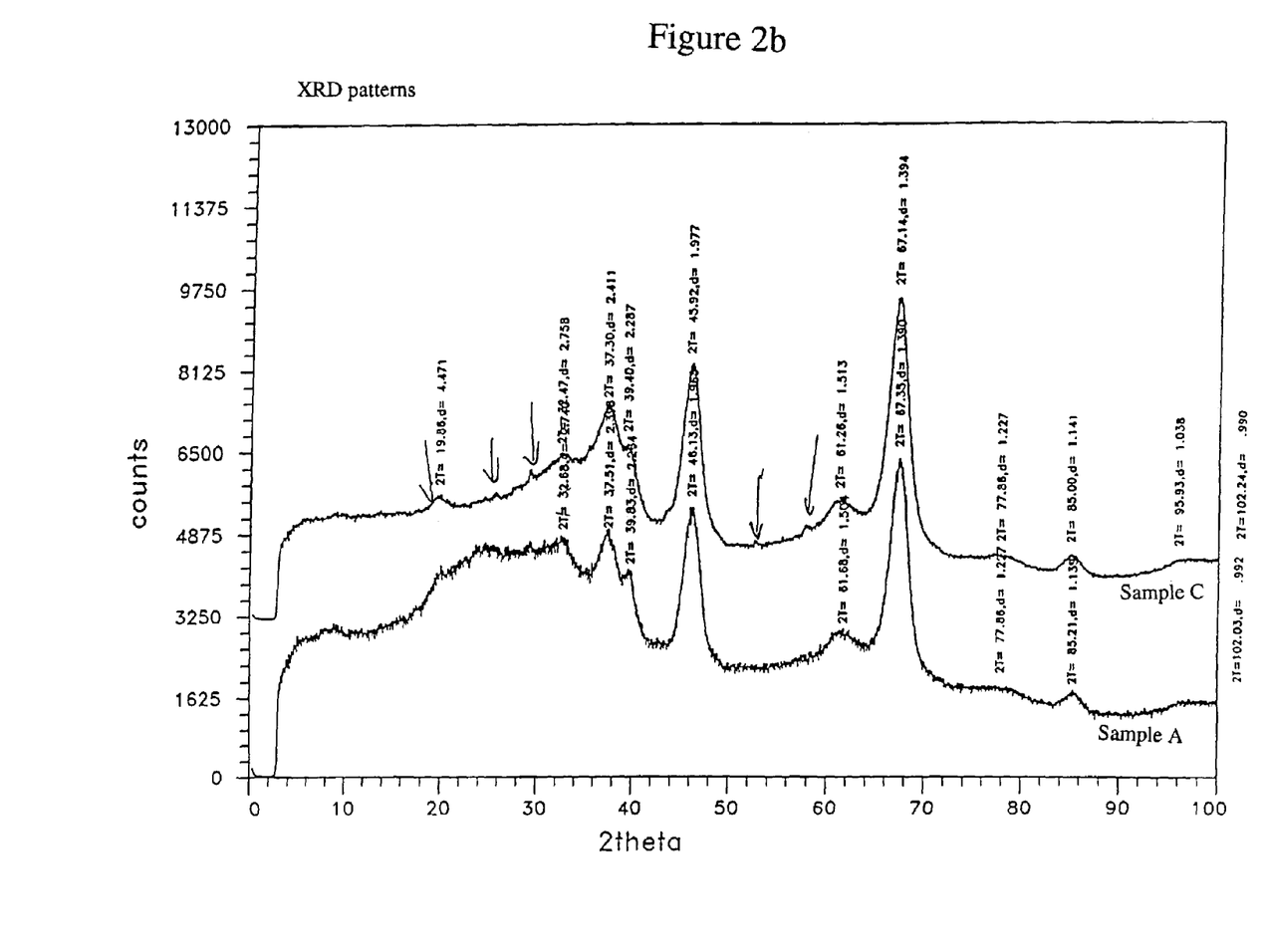
Figure 2C:
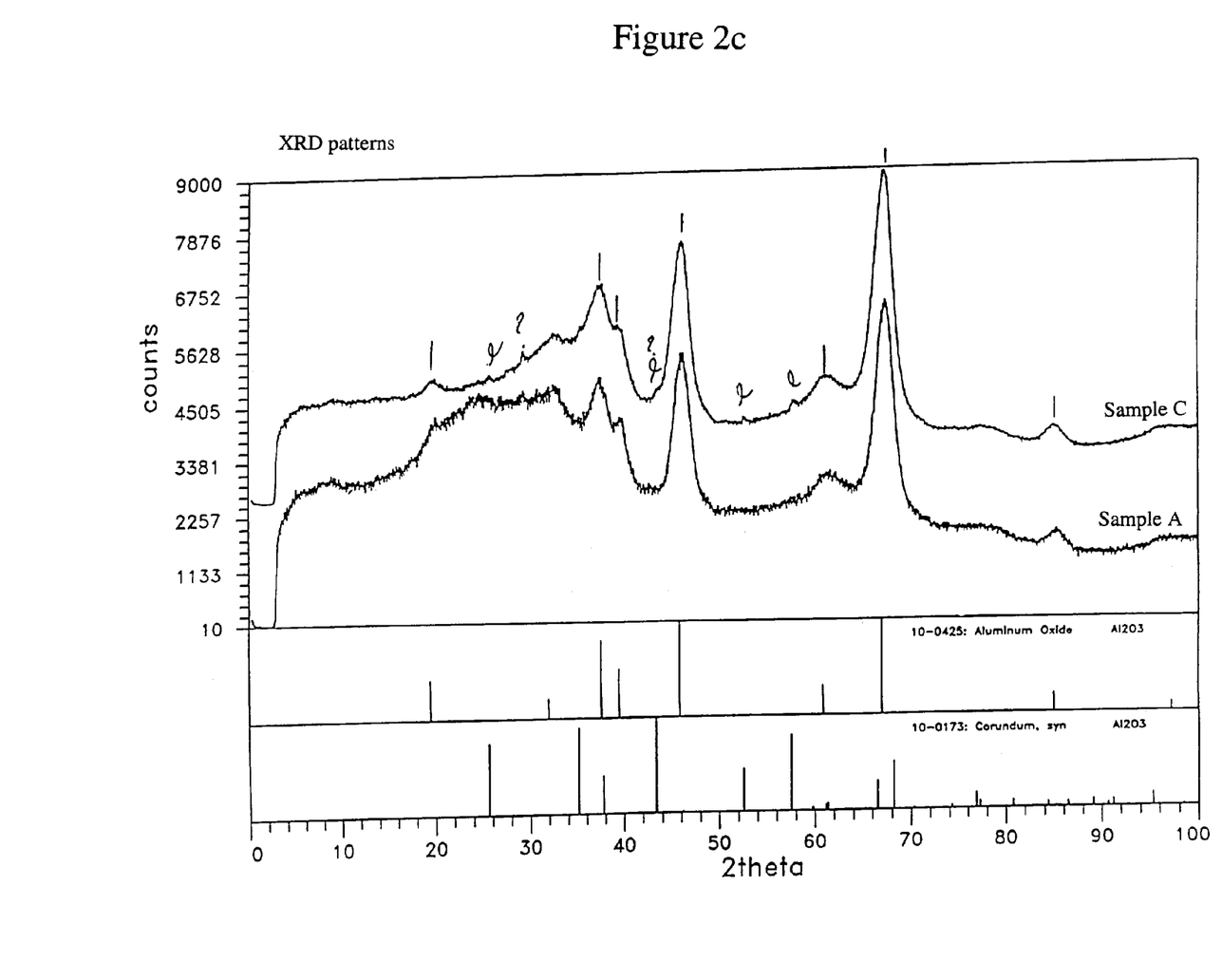

X-ray diffraction patterns of Sample A and Sample C are shown in FIGS. 2a–2d. The oven-dried stage in FIG. 2a shows a broad amorphous and fine crystalline pattern that does not match any lines for $Al_2O_3$ or corundum ceramics. After heat treating pellet A-2 to 800° C. (pre-sintering), a few peaks of the desired ceramics appear but are still very broad and many of the unknown amorphous peaks still exist (see FIG. 2b and FIG. 2c). After the 1550° C. sintering process (see FIG. 2d), the x-ray pattern of pellet A-2 is much sharper and shows all of the ceramic peaks desired with a very fine grain size (calculated at 800 Å). Pellet A-2 contained a background contamination identified as aluminum boride. This contamination was attributed to some cross contamination of $B_4C$ powder used in another sample.

Figure 3:
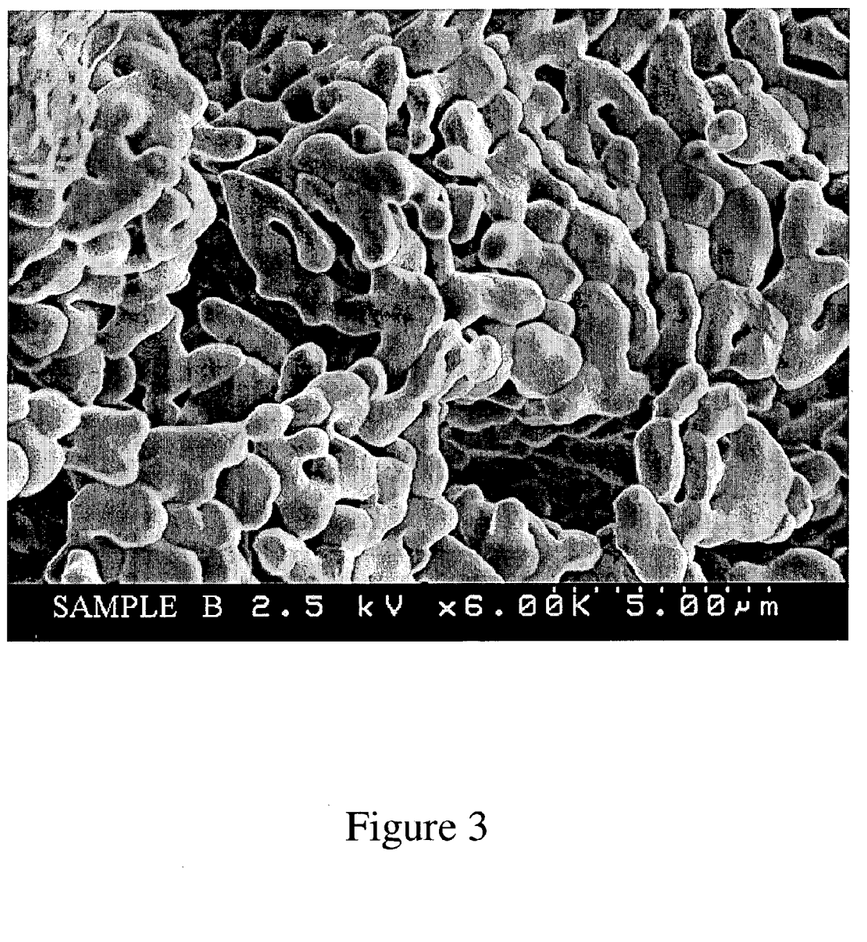
FIG. 3 is an SEM micrograph of Sample B at 6,000 times magnification.
Figure 4A:
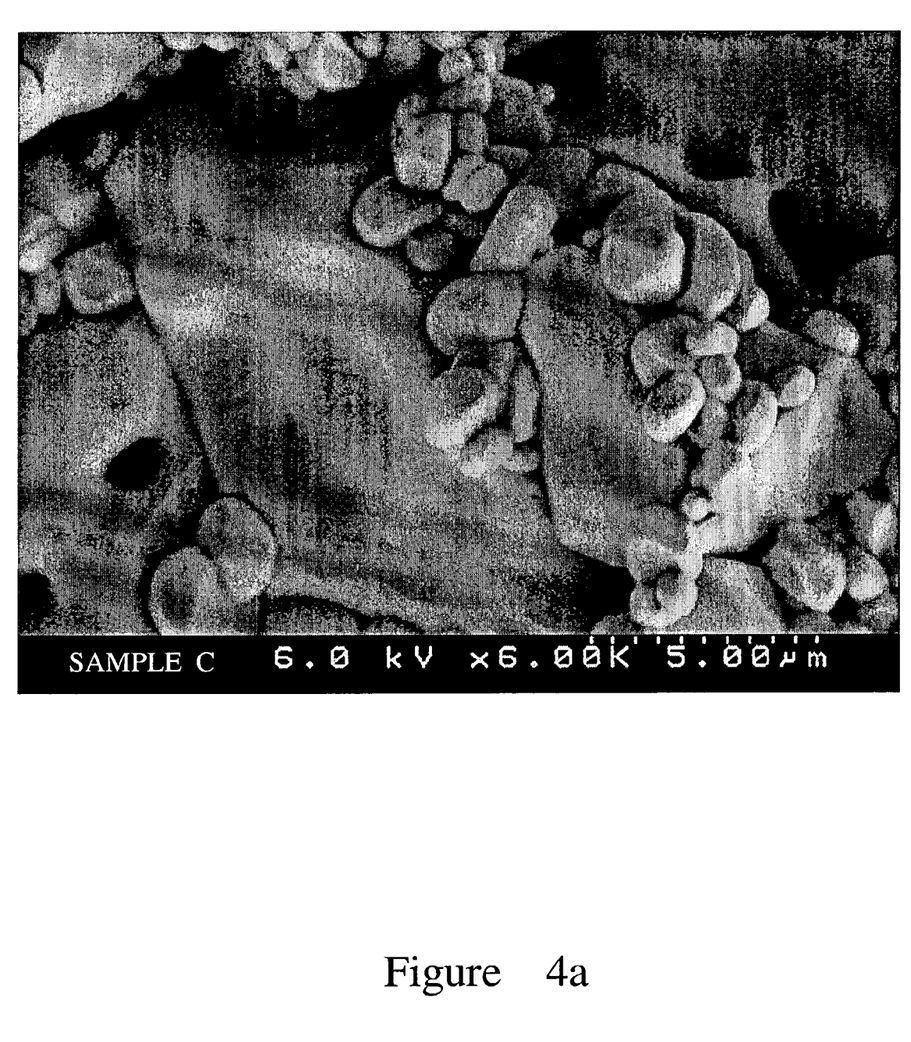
FIG. 4a is an SEM micrograph of Sample C at 6,000 times magnification.
Figure 4B:
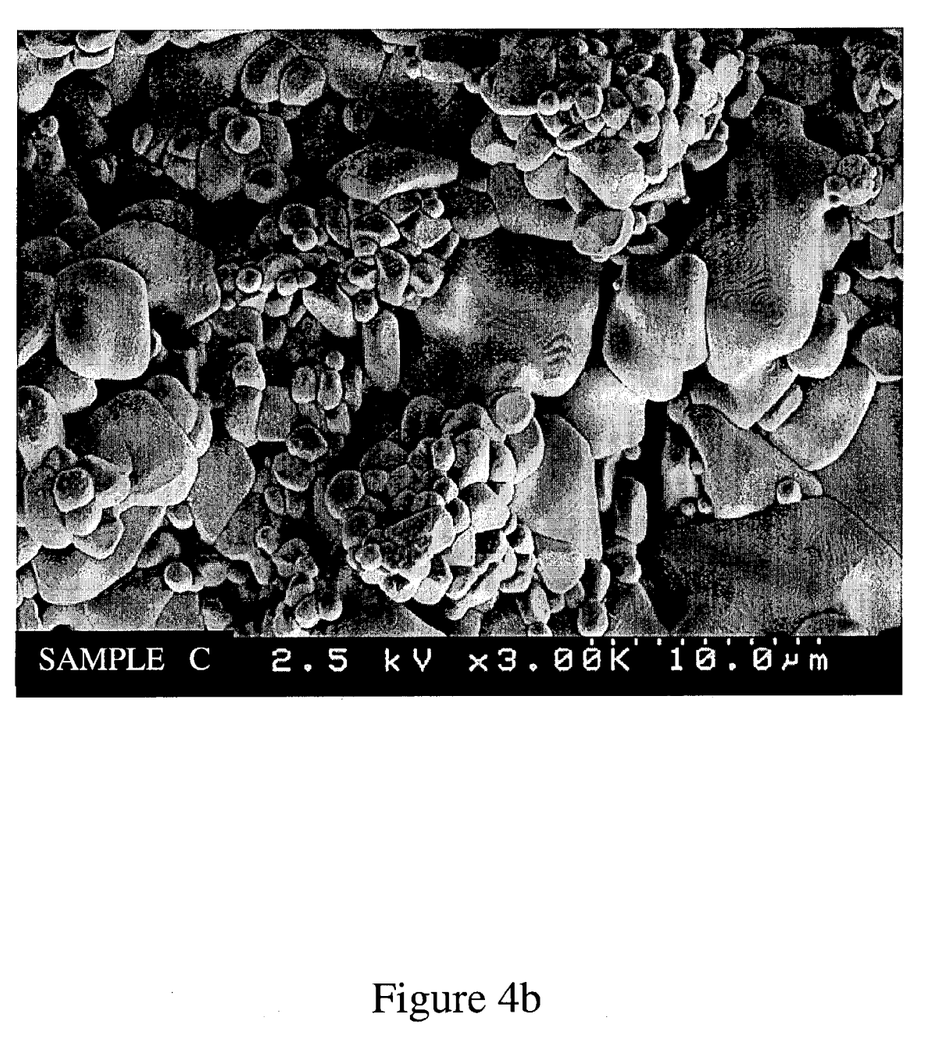
FIG. 4b is an SEM micrograph of Sample C at 3,000 times magnification.

Aerogel Sample B and aerogel Sample C were prepared as air-dried granules. One pellet was cold pressed and sintered from Sample B, pellet B-1. Pellet B-1 was cold pressed from the oven dried granules and sintered at 1550° C. A large weight loss (36.7%) was the main factor creating the low sintered density (45.1% of theoretical density). Two pellets were cold pressed and sintered from Sample C, pellet C-1 and pellet C-2. The granules for pellets C-1 and C-2 were ball milled in an $Al_2O_3$ mill/ball system over night. Subsequent sieving reduced these granules to a size less than 80 mesh (<177 microns). Pellet C-1 was cold pressed and sintered to a density of 81.2% even with a weight loss of 38.6%. For further increase in density, pellet C-2 was heat treated to 800° C. for 1 hour before cold pressing and sintering. Pellet C-2 lost 29.1% by weight from the 800° C. heat treatment and another 3.35% during sintering at 1550° C. Pre-heat treating the powder reduces the gases coming off during sintering and thus increases the density. Results for pellets B-1, C-1 and C-2 are summarized in FIG. 1. FIG. 3 is an SEM micrograph of Sample B. FIGS. 4a and 4b are SEM micrographs of Sample C at different levels of magnification, 6,000 times and 3,000 times, respectively.

Figure 2D:
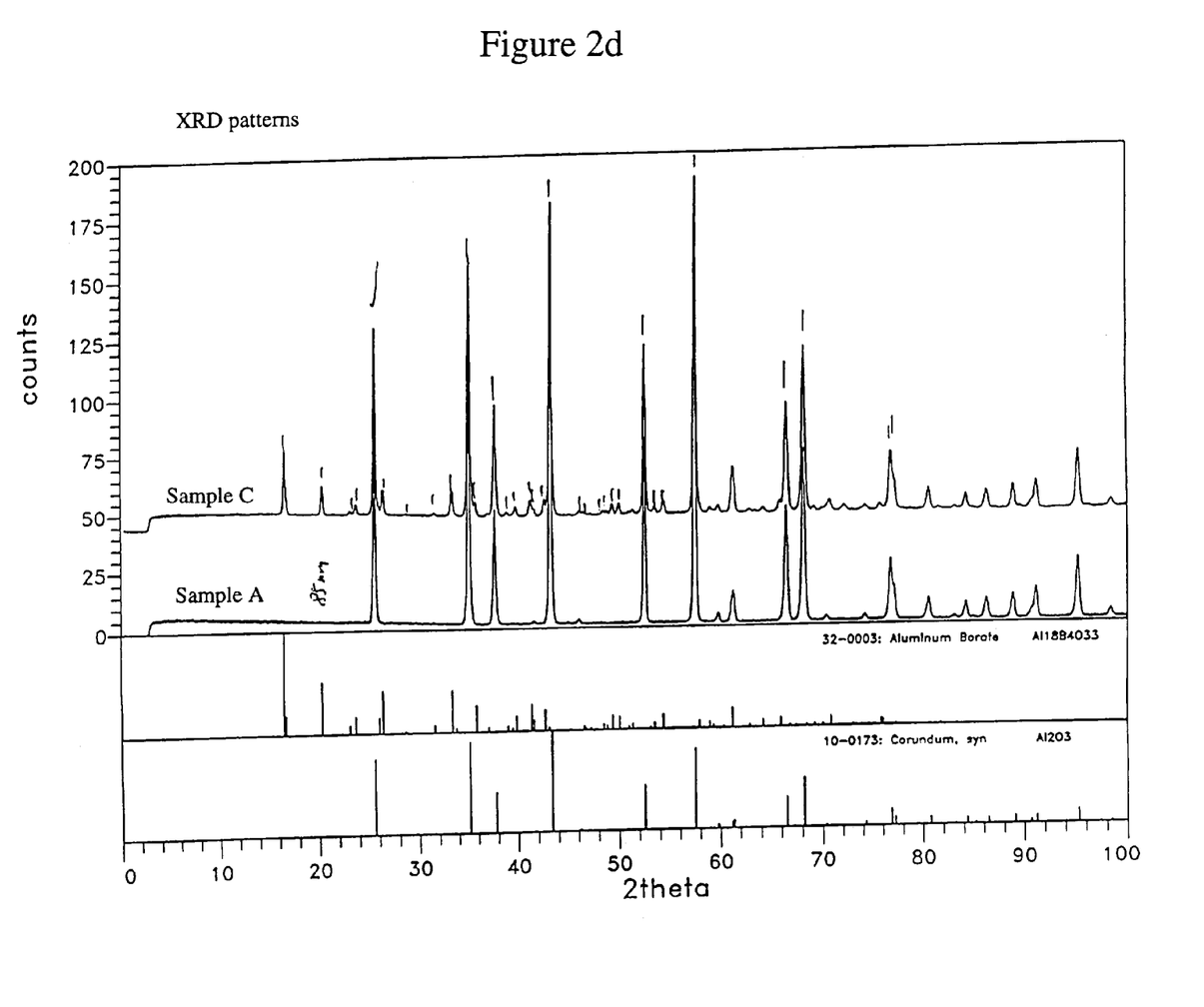

The x-ray diffraction patterns of Sample C and the pellets formed from Sample C, i.e., pellet C-1 and pellet C-2, are also shown in FIGS. 2a–2d. The pattern of the as-received granules in FIG. 2a are significantly different from Sample A and do not correspond to any $Al_2O_3$ ceramic patterns expected. After pre-heat treating Sample C to 800° C., the granules form a pattern (shown in FIG. 2b) that is very similar to pre-heat treated Sample A. The two ceramic patterns are listed below the aerogel patterns in FIG. 2c. The patterns become very sharp and crystalline after the 1550° C. sintering step as shown in FIG. 2d.

The granules from Sample E and Sample G were also pre-heat treated at 800° C. for one hour. These granules lost 40.3% and 28.6% by weight, respectively (see FIG. 1).

Figure 5A:
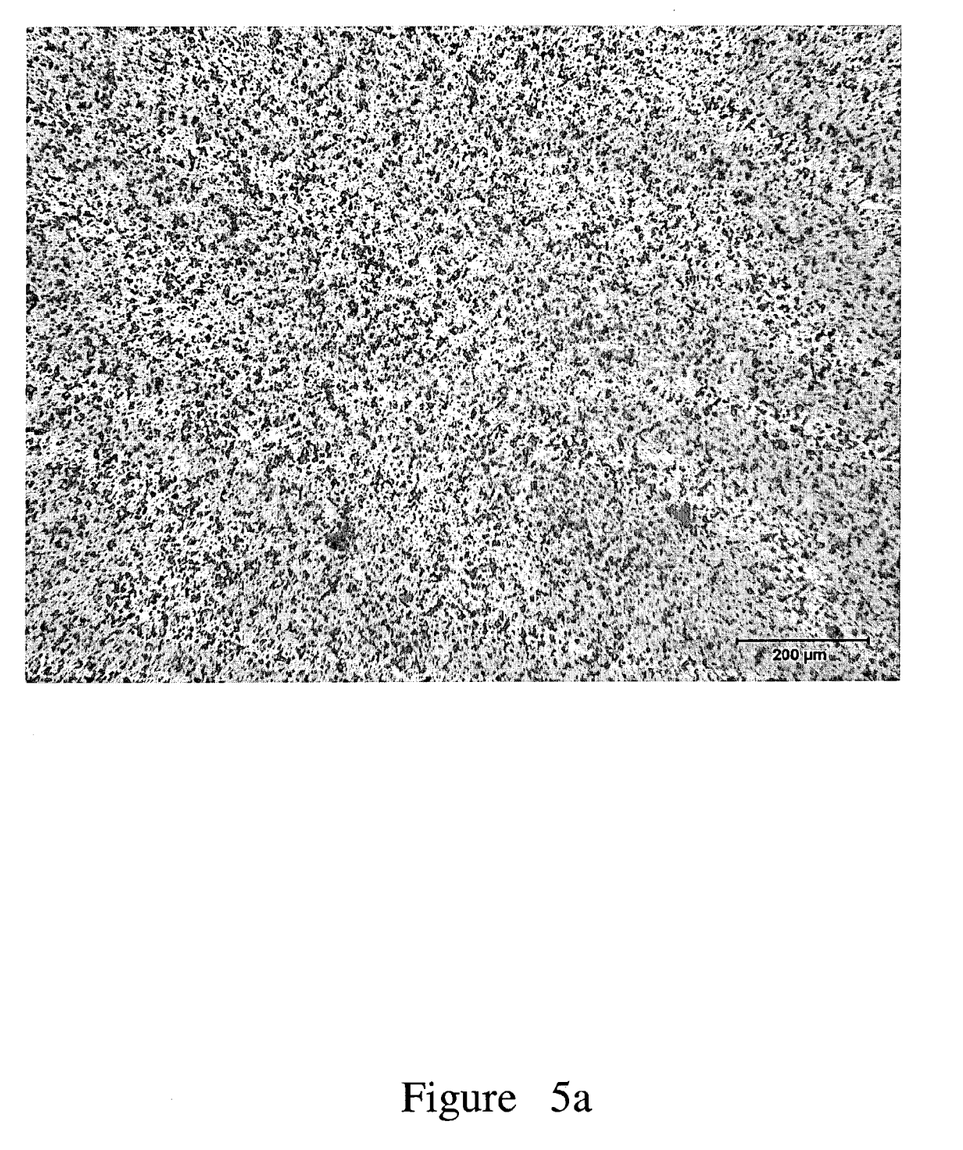
FIG. 5a is an SEM micrograph of a 30 vol. % $B_4C/Al_2O_3$ sol-gel at 200 times magnification.
Figure 5B:
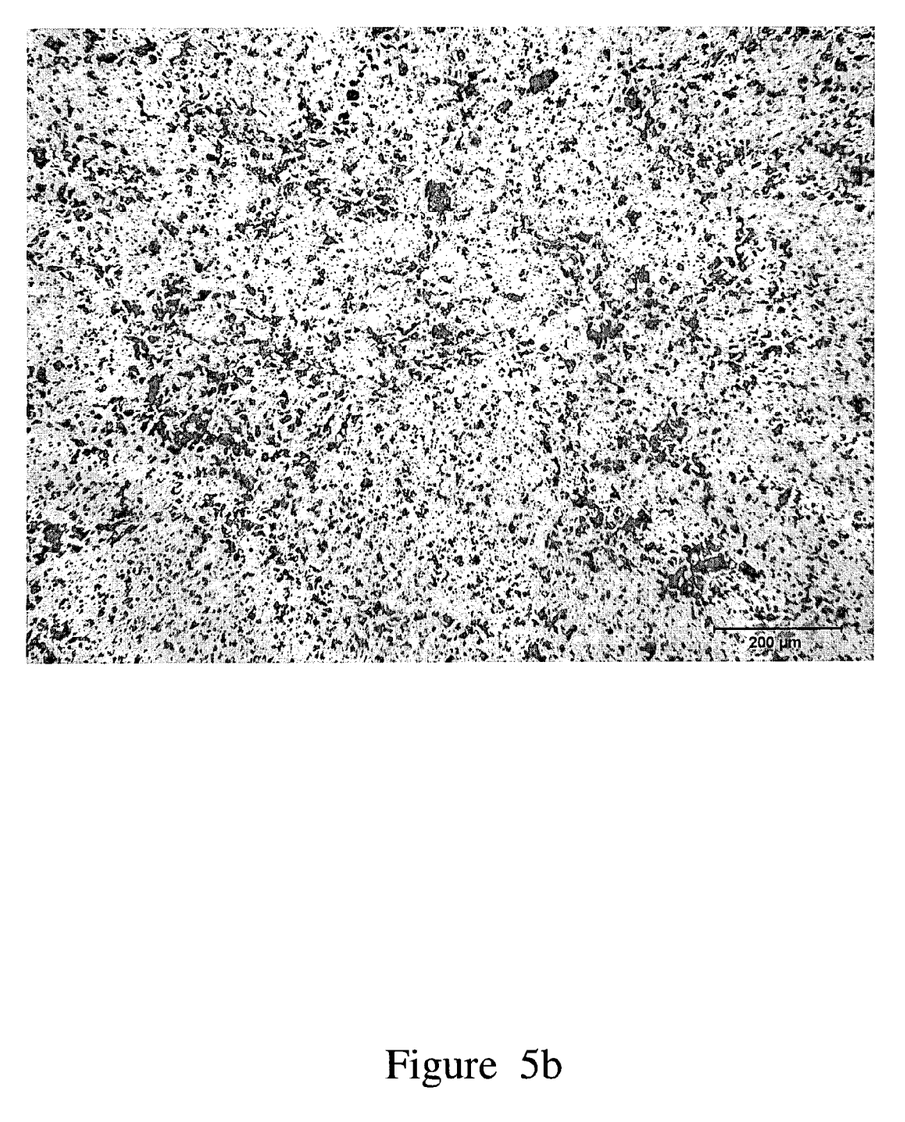
FIG. 5b is an SEM micrograph of a 30 vol. % $B_4C/Al_2O_3$ sol-gel at 500 times magnification

Sample D and Sample F were ball-milled to form granule mixtures of 30% by volume $B_4C$ fine powder (<2 μm) and $Al_2O_3$ aerogel. After oven drying these ball-milled granules to −80 mesh, a pellet was cold pressed and sintered to 1550° C. The $B_4C$ was converted into $B_2O_3$ and reacted with the $Al_2O_3$ to form an aluminum boride pellet, i.e., pellet DF-1 in referred to in FIG. 1. Sintering this powder under vacuum or providing a reducing environment while sintering will prevent the $B_4O$ to $B_2O_3$ reaction. FIGS. 5a and 5b are an SEM micrographs of a 30 vol. % $B_4C/Al_2O_3$ sol-gel.

Two batches of sol-gel powder, Sample D and Sample E, were prepared for consolidation into pellets by hot pressing. The application of pressure during the sintering of these powders at lower temperatures (1500° C.) should result in less grain growth and higher densities. Sample E was washed with $NH_4OH$ and Sample D was only air-dried. Both Sample D and Sample E were oven dried at 80° C. for 24 hours and ball milled for 24 hours before sieving through an 80 mesh sieve. Roughly 30 weight percent of organic compounds were still present in each resulting powder, but these organic compounds vaporized before the powders reach 1100° C. in the hot pressing operation. The powders were loaded into graphfoil lined graphite dies and punches and a pressure of 1,000 psi was applied through the punches onto the powders before heating the die assembly to 1100° C. At this temperature, all the organic compounds were vaporized and escape along the gaps between the dies and punches. The $B_4C$ powder in Sample D was protected from oxidizing by a nitrogen atmosphere and the reducing environment produced by the graphite dies. After reaching 1100° C., the pressure was increased to 3,000 psi and the temperature increased to 1500° C. The powders were densified at 3,000 psi and 1500° C. for 15 minutes before releasing the pressure and lowering the temperature to ambient conditions.

The densities of the resulting hot pressed pellets, D-1 and E-1, were determined by the immersion density method in water. The pellets measure 1 inch diameter by ⅛ inch thickness. The E-1 pellet was near full density and the D-1 pellet had slight interconnecting porosity of a few percent. The cross sectional section of each pellet was mounted and polished for microstructure examination.

FIG. 5a shows the polished face of pellet D-1 at 200 times magnification. A very fine and uniform dispersion of $B_4C$ particles in an $Al_2O_3$ matrix can be seen. FIG. 5b shows the polished face of pellet D-1 at 500 times magnification. Even at 500 times magnification, the resolution of particles is still hard to detect, thus indicating a sub-micron structure. No porosity could be resolved from the amplification available, so it is possible that the pores detected by immersion density could be surface pores at the edge of the pellet.

Isolated regions of pores result from entrapped pores in the larger agglomerates not broken down during the ball milling and sieving operations. Future processing is required to reduce the powder to less than 325 mesh. The sub-micron microstructure of pellet D-1 is beyond the limits of the light microscope, but could be studied with SEM and TEM methods.

Figure 6A:
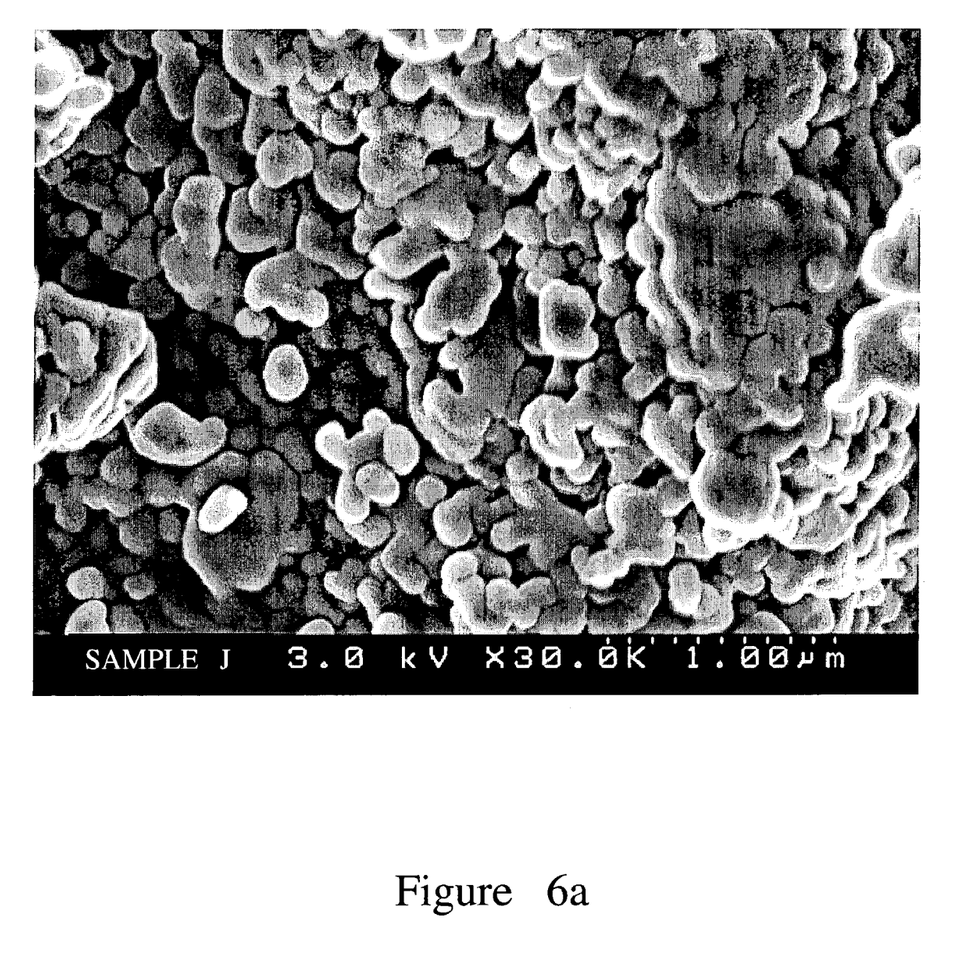
FIG. 6a is an SEM micrograph of a pellet of Sample J at 30,000 times magnification.
Figure 6B:
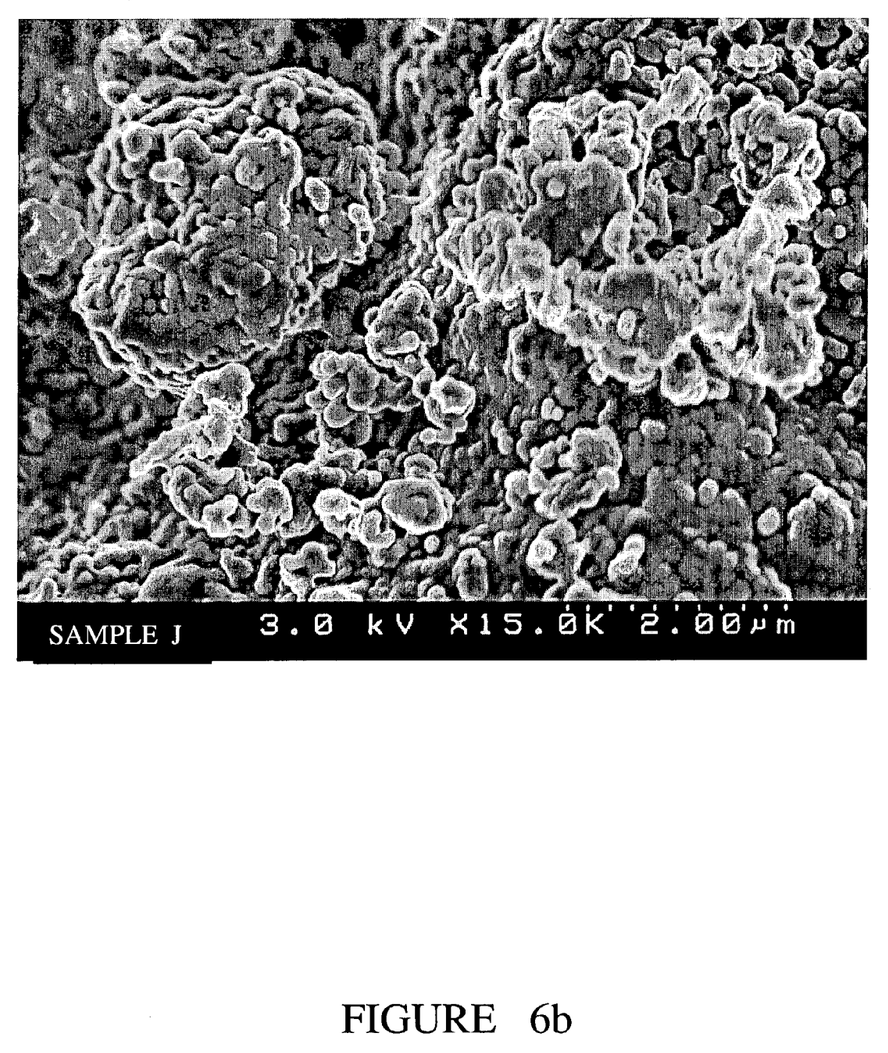
FIG. 6b is an SEM micrograph of a pellet of Sample J at 15,000 times magnification.

SEM micrographs of Sample J ($Al_2O_3$ ammonia washed powder) are shown in FIGS. 6a and 6b.

Sample K, 33 vol. % $TiC/Al_2O_3$ produced from commercial TiC powder (density ~4.93 g/cc, particle size 0.25–10 µm diameter) and sol gel $Al_2O_3$ powder, was hot pressed to full density. The hot pressed disk was cut into four-point bend test bars and two cutting tools. The four-point bent test is described at the web address npl.co.uk/vamas/fourpoint-help.html. The fracture toughness was measured at 4.3 Mpa/m (megapascals per meter) and the fracture strength was 44 Ksi.

Results of initial densification attempts via hot isostatic pressing (HIP) of some powders is summarized in Table 3.

TABLE 3

| Sample ID | Composition | Conditions | Density (gm/cc)/% | Sound Velocity mm/µsec | Shear Velocity mm/µu |
|---|---|---|---|---|---|
| Hot Pressed Nano-Powders from Sol-gel Process | | | | | |
| Sample J (J-1) | $Al_2O_3$ | Hot Pressed 1600 ° C. | 3.73/94 | 10.213 | 6.4 |
| Sample J (J-2) | $Al_2O_3$ | Hot Pressed 1750 ° C. | 3.93/100 | 11.018 | 6.7 |
| Sample J (J-2) | $Al_2O_3$ | Hot Pressed 1600 ° C. | 3.35/85 | n/a | n/a |
| Sample J (J-2) | $Al_2O_3$ | Hot Pressed 1750 ° C. | 3.76/95 | n/a | n/a |
| Sample D | 30 vol.% $B_4C/Al_2O_3$ | Hot Pressed 1600 ° C. | 3.5/87 | n/a | n/a |
| Sample K | 33 vol.% $TiC/Al_2O_3$ | Hot Pressed 1600 ° C. | 3.6/84 | n/a | n/a |
| Hot Pressed Nano-Powders from commercial Process | | | | | |
| GEM-2 | 33 vol.% $TiC/Al_2O_3$ | Hot Pressed 1750 ° C. | 4.24/100 | 10.439 | 6.1 |
| Cermet-1 | 45 vol. % BC/Al | Infilt. 1100 ° C. | 2.62/100 | 11.219 | 6.8 |

SUMMARY

Fully dense pellets can be obtained, if desired, by slightly modifying the powder preparation and hot pressing procedures. For instance, optimal packing efficiency can be obtained by optimizing the distribution of varying particle sizes. Reduction of the large agglomerates in the powder will eliminate the regions of pores seen in FIG. 1. Alternately, if a uniformly porous body is desired for the application in mind (filters, solid-oxide fuel cells, membranes, etc.), these agglomerates may be desirable. In applications where strength and non-permeability are desired (ceramic cutting tools, wear parts, auto parts, etc.), these porous regions can be eliminated by proper ceramic processing procedures or during the aerogel processing. Any other oxide can be added during aerogel processing to obtain different properties. Some examples include MgO, CaO, $ZrO_2$, and $Y_2O_3$. $NH_4OH$ washed powder lost the most weight while acetone washed powder lost the least.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A method comprising:

dissolving one or more metal salts in a solvent or solvent matrix to form a metal salt solution;

adding one or more uniformly dispersed powdered materials to said metal salt solution to form a composite dispersion, wherein said powdered materials are selected from the group consisting of TiC and $B_4C$;

adding a proton scavenger to the composite dispersion to form a gel, wherein the proton scavenger is an epoxide compound; and drying the gel to form a composite material.

2. The method of claim 1, further comprising washing said gel with a base.

3. The method of claim 2, wherein said base comprises aqueous ammonia ($NH_3$).

4. The method of claim 1, wherein said proton scavenger is propylene oxide.

* * * * *